C. L. FRENCH.
TUBULAR CONDUIT.
APPLICATION FILED MAY 2, 1914.

1,223,864.

Patented Apr. 24, 1917.

WITNESSES

INVENTOR
CHARLES L. FRENCH
BY
A. T. Palmer
ATT'Y.

UNITED STATES PATENT OFFICE.

CHARLES L. FRENCH, OF CAMBRIDGE, MASSACHUSETTS.

TUBULAR CONDUIT.

1,223,864.  Specification of Letters Patent.  Patented Apr. 24, 1917.

Application filed May 2, 1914. Serial No. 835,859.

*To all whom it may concern:*

Be it known that I, CHARLES L. FRENCH, of Cambridge, in the county of Middlesex and State of Massachusetts, have invented certain new and useful Improvements in Tubular Conduits, of which the following is a specification.

This invention relates to insulated conduits and especially refers to portable filling tubes such as are used in automobile garages to transfer gasolene from a storage tank to a waiting car or from one tank to another.

As ordinarily constructed, these tubes are formed of successive layers of soft rubber and canvas and are internally wound with a metallic wire to impart greater stiffness than would be afforded by the rubber and canvas alone.

At each end is inserted a metal coupling for the purpose of firmly, yet detachably uniting the tube to suitable pump and discharge nozzles so as to avoid leakage. For the purpose of easy assembling, the internal metallic winding terminates a short distance from the inner ends of the nozzle fittings so as to provide a neck of greater flexibility than that of the balance of the tube which, while stiffened against any collapsing tendency, yet has sufficient flexibility to permit of considerable latitude of motion.

In use, it has been discovered that the rush of gasolene through the tube will generate a certain amount of static electricity, so-called, which collects about the metallic fittings at the delivery end and which may be discharged with a spark when another metallic body is brought within proper distance. As this spark may cause and has caused ignition of the gasolene, some means for eliminating the possibility of accident or misuse of the filling apparatus has seemed not only desirable but necessary, and such means form the basis of this application.

In the drawings which accompany and form part of this specification,

Figure 1:
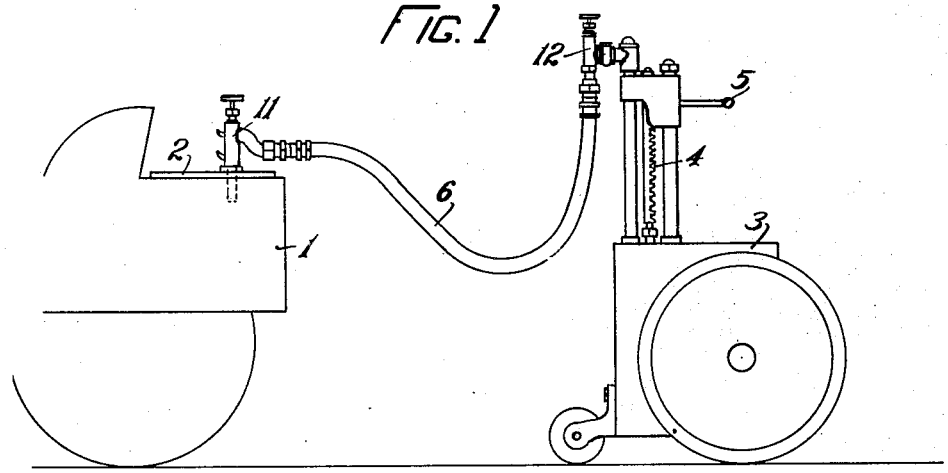
Figure 1 is a diagram illustrating the method of use of the filling tube.
Figure 2:
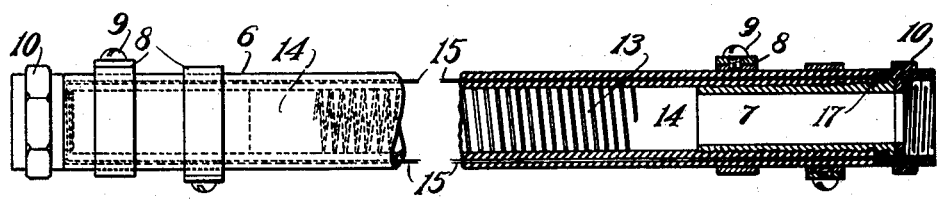
Fig. 2 is an enlarged view, partly in section, showing a tube equipped with my invention.
Figure 3:
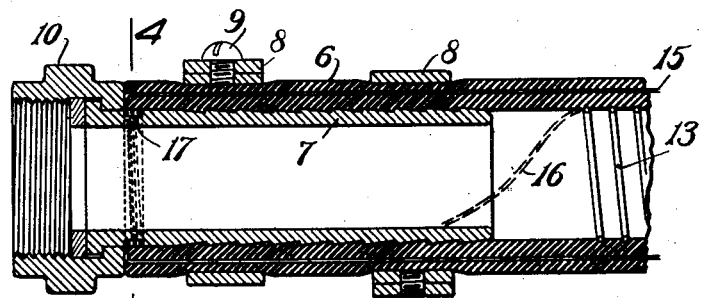
Fig. 3 is a still further enlarged sectional view of one end of the filling tube.
Figure 4:
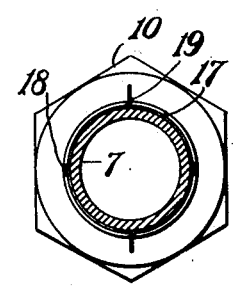
Fig. 4 is a section on line 4—4 of Fig. 3.

The automobile, 1, fitted with a gasolene tank, 2, is positioned to receive gasolene from a portable tank 3 which is equipped with a suitable pumping device 4, operated by a handle marked 5. The conduit 6 is fitted at each end with a flanged socket-piece 7, of metal construction, the same being firmly held within the conduit by clamps 8 and screws 9.

By means of the threaded union 10, the ends of conduit 6 may be suitably connected to the discharge nozzle 11 and the pump nozzle 12. Within conduit 6 is a metal wire coil 13 adapted to add stiffness to the canvas and rubber of which the conduit is formed. Near each socket-piece 7, a short neck of conduit, marked 14, is left unsupported by the wire 13 in order to provide suitable flexibility at those points.

The above description will apply to conduits as now made and sold and, in itself, does not comprise patentable matter under this application.

For the purpose of preventing the accumulation of static electricity at the discharge nozzle, I provide a metal conductor in the form of one or more flexible, metallic strips or wires 15 which are embedded in the side walls of conduit 6 and are so united to each socket-piece 7 as to insure an unbroken electrical connection from end to end of said conduit.

By this means, the electricity, as soon as formed, escapes through this conductor to the pump frame and thence to ground.

It is sometimes necessary to repair the conduit by shortening it and making new connection with the socket-piece 7. With my wire or wires 15, such repairs would involve no special hardship in keeping up the electric communication, as the end or ends could be allowed to project from the new end of the conduit to form a proper bond, such as will now be described.

Just back of union 10, I preferably form an annular groove 17 on the socket-piece 7 so that the projecting end of wire 15 may be wrapped therein so as to be entirely out of the way of the sliding movement when the conduit is slipped into place. In attaching this projecting end, the conduit is slightly withdrawn from contact with union 10 so as to expose groove 17. The wire 15 is then given one or more turns around the socket-piece 7 and is soldered at 18, preferably at a point ninety degrees removed from that of initial wrapping 19. This latter feature provides leverage or freedom enough for play of the wrapped end so the conduit can be thereafter drawn up close to the union 10, as shown.

This close fit is not only desirable as a matter of looks, but it serves to steady the action of union 10 and helps to prevent any looseness in the joint.

It is understood that I do not limit myself to the precise construction shown except as required by the scope of the appended claims.

What I claim is:—

1. A conduit formed of material possessing high electrical resistance, metal fittings, one at each end of said conduit and detachably secured thereto, and external, annular grooves, one on each fitting and so positioned as to be concealed by the conduit when assembled for use; in combination with a strip or wire composed of material possessing low electrical resistance and embedded within the wall of said conduit throughout its length, the ends of said strip or wire being adapted to occupy said grooves, and means whereby electrical contact between said ends and said fittings may be insured, said means being so positioned as to permit the full assembling of said conduit upon said fittings, after said means have been employed, without disturbing said contact.

2. A filling tube comprising a flexible conduit formed of insulating material; a metallic fitting at one end of said conduit and adapted for connection to a suitable pumping device; and a metallic faucet at the opposite end of said conduit; in combination with a flexible metallic strip, or wire, adapted to form a path of low electrical resistance between said fitting and said faucet.

In testimony whereof, I have affixed my signature, in the presence of two witnesses.

CHARLES L. FRENCH.

Witnesses:
A. T. PALMER,
ARTHUR E. THAYER.